United States Patent
Scheinman et al.

(10) Patent No.: US 11,151,194 B2
(45) Date of Patent: Oct. 19, 2021

(54) DATA COLLECTION AND INTEGRATION SYSTEM

(71) Applicant: SAP SE, Walldorf (DE)

(72) Inventors: Lynn Scheinman, Stuttgart (DE); Cody Wedl, Malschenberg-Rauenberg (DE)

(73) Assignee: SAP SE, Walldorf (DE)

( * ) Notice: Subject to any disclaimer, the term of this patent is extended or adjusted under 35 U.S.C. 154(b) by 281 days.

(21) Appl. No.: 16/407,315

(22) Filed: May 9, 2019

(65) Prior Publication Data

US 2020/0356597 A1    Nov. 12, 2020

(51) Int. Cl.
*G06F 16/901* (2019.01)
*G06F 16/23* (2019.01)
*G06F 16/248* (2019.01)

(52) U.S. Cl.
CPC ......... *G06F 16/9024* (2019.01); *G06F 16/23* (2019.01); *G06F 16/248* (2019.01)

(58) Field of Classification Search
CPC ..... G06F 16/9024; G06F 16/23; G06F 16/248
See application file for complete search history.

(56) References Cited

U.S. PATENT DOCUMENTS

| | | | |
|---|---|---|---|
| 9,373,024 B2 | 6/2016 | Liu et al. | |
| 9,633,076 B1* | 4/2017 | Morton | G06F 16/248 |
| 9,665,777 B2 | 5/2017 | Naikal et al. | |
| 9,830,377 B1* | 11/2017 | Ray | G06F 16/215 |
| 9,854,450 B2 | 12/2017 | Abdullah et al. | |
| 2004/0107203 A1* | 6/2004 | Burdick | G06F 16/20 |
| 2004/0249789 A1* | 12/2004 | Kapoor | G06F 16/215 |
| 2005/0187794 A1* | 8/2005 | Kimak | G16H 70/00 705/3 |
| 2006/0080312 A1* | 4/2006 | Friedlander | G06F 16/3334 |
| 2006/0294151 A1* | 12/2006 | Wong | G06F 16/25 |
| 2009/0125540 A1* | 5/2009 | Dettinger | G06F 16/2471 |
| 2009/0327115 A1* | 12/2009 | Schilder | G06Q 40/02 705/35 |

(Continued)

FOREIGN PATENT DOCUMENTS

WO    WO-2017-200691 A1    11/2017

OTHER PUBLICATIONS

"Breaking down barriers: The potential for common data standards to transform criminal justice," techUK, www.techuk.org, pp. 1-20, Oct. 2014.

*Primary Examiner* — Jorge A Casanova
(74) *Attorney, Agent, or Firm* — Sterne, Kessler, Goldstein & Fox P.L.L.C.

(57) ABSTRACT

Disclosed herein are system, method, and computer program product embodiments for providing a data collection and integration system. An embodiment operates by determining that first data and second data retrieved from a first and second data sources are stored in a database. Both the first data and the second data are each categorized, and at least a portion of the first one of the categories includes identical information for both the first data and the second data. On a visual interface, a visual representation of the categorized first data is displayed simultaneously with the categorized second data, including the categorized identical information, and input indicating whether the identical information refers to a same entity is received. The database and the visual interface are updated based on the input.

20 Claims, 6 Drawing Sheets

(56) References Cited

U.S. PATENT DOCUMENTS

| | | | |
|---|---|---|---|
| 2014/0164378 A1* | 6/2014 | Levandoski | G06F 16/25 |
| | | | 707/737 |
| 2015/0134603 A1* | 5/2015 | Melamed | G06Q 50/01 |
| | | | 707/609 |
| 2015/0161622 A1 | 6/2015 | Hoffmann et al. | |
| 2015/0193511 A1* | 7/2015 | Woody | G06F 16/248 |
| | | | 707/722 |
| 2018/0113928 A1* | 4/2018 | Oberhofer | G06F 16/215 |
| 2018/0276280 A1* | 9/2018 | Trudel | G06F 16/288 |
| 2019/0303371 A1* | 10/2019 | Rowe | G06F 16/24564 |
| 2019/0384847 A1* | 12/2019 | Bobbala | G06F 16/214 |

* cited by examiner

| Object 210A | | |
|---|---|---|
| o | TYPE | From |
| o | CATEGORY | ContactReport |
| o | DESC | ['RAPConSource'] |
| o | CLASS1 | ['ContactSource'] |
| o | CLASS2 | ['RAPCode'] |
| o | CLASS3 | ['RAPOrder'] |
| o | ORIGIN | ['ContactID'] |
| o | ORIGINREF | ['FormNo'] |
| o | LOGSOURCE | VPReport |

| Location 210B | | |
|---|---|---|
| l | TYPE | ['Type'] |
| l | CATEGORY | Location in ['ContactID'] |
| l | DESC | ['Latitude'] |
| l | CLASS1 | ['Longitude'] |
| l | CLASS2 | ['LSOA'] |
| l | CLASS3 | ['Postcode'] |
| l | ORIGIN | ['AreaCouncil'] |
| l | ORIGINREF | ['Ward'] |
| l | LOGSOURCE | ['Easting'], ['Northing'] |

| Event 210D | | |
|---|---|---|
| e | TYPE | ContacReport |
| e | CATEGORY | ['ContactMethod'] |
| e | DESC | ['ContactReason'] |
| e | CLASS1 | ['Status'] |
| e | TIME | ['RefLinkedDate'] |
| e | DATE | ['ContactDate'] |
| e | ORIGIN | ['CODE'] |
| e | ORIGINREF | ['ContactID'] |
| e | LOGSOURCE | ['ContactOutcome'] |

| Person 210C | | |
|---|---|---|
| p | GEN | GenUnk |
| p | FNAME | ['Children'] |
| p | LNAME | ['MOSAICType'] |
| p | DOB | ['Age'] |
| p | POB | ['Tenure'] |
| p | ORIGIN | ['Income'] |
| p | ORIGINREF | ['PersonID'] |
| p | LOGSOURCE | ['HHComposition'] |

FIG. 2

DATA COLLECTION AND INTEGRATION SYSTEM

BACKGROUND

Different data sources often have their own format and terminology with regards to how they store and update data. Because of these differences, integrating and harmonizing information from various data sources into a single location provides unique technical challenges. Rather than trying to reconcile these differences amongst the data sources, it is often easier to require a user to access each data source separately. However, individual access to the data sources prevents the user from seeing a full picture of the data, and may cause the user to miss valuable insights about relationships amongst the data from varying sources.

BRIEF DESCRIPTION OF THE DRAWINGS

The accompanying drawings are incorporated herein and form a part of the specification.

FIG. 2 is a block diagram illustrating an example categorization of data based on the POLE (person, object, location, event) categories, according to an embodiment.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a data collection and integration system.

Figure 1:
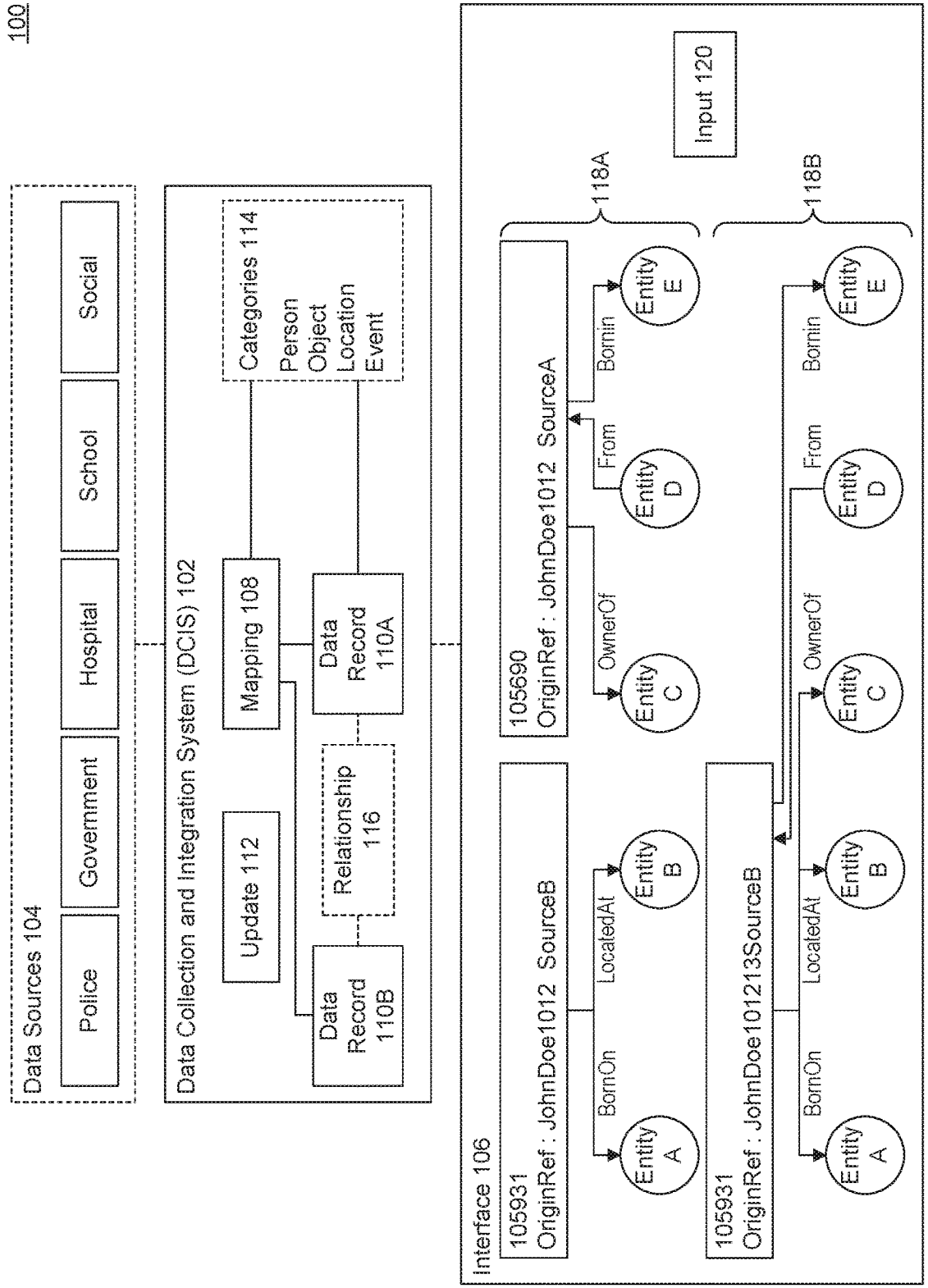
FIG. 1 is a block diagram illustrating example functionality for providing data collection and integration functionality, according to some embodiments.

FIG. 1 is a block diagram 100 illustrating example functionality for providing data collection and integration functionality, according to some embodiments. Data collection and integration system (DCIS) 102 may collect or retrieve information from different data sources 104. DCIS 102 may integrate and harmonize the information from the various data sources 104 and display the information on a unified interface 106.

Rather than requiring a user to individually access the varying computing systems that are storing the information of data sources 104 and trying to manually analyze the data across different screens or devices, DCIS 102 provides a central repository and interface 106 where the information can be viewed by a user, analyzed, and any relationships between the data or information can be discovered, identified, modified, and stored or maintained.

The example data sources 104 illustrated in the example of FIG. 1 represent different or independently maintained data systems across different companies, agencies, and organizations which include information that may be collected about people, objects, locations, and/or events. The example data sources include police records, government records, hospital and medical records, school records, and social media posts. Each data source 104 may have its own unique interface and login information, or other method of access data (which may include manual access to physical files).

These data sources 104 may include various files, information stored across different programs (word processing, spreadsheets), data that needs to be digitized before uploading, and streaming data. Each data source may have its own technology base, API (application programming interface), system login or accreditation, security protocol, and database, spreadsheet, or file format by which data is organized.

DCIS 102 may include or develop a mapping 108 between how information is being stored on each data source 104 and how that information is going to be collected or stored across one or more data records 110A, 110B of DCIS 102. As discussed in greater detail below, the data records 110 of DCIS 102 may be stored in a row-oriented database, column-oriented database, graph database, or other storage mechanism.

In an embodiment, mapping 108 may be created by users or administrators prior to or during an initial setup period, or upload or retrieval of data from a data source 104. Mapping 108 may include a user providing login information (username, passwords), identifying what information is being retrieved or uploaded, and the alignment or correspondence between records from the data source 104 to the various fields, columns, rows of records 110 of DCIS 102. In an embodiment, mapping 108 may indicate a subset of information from a data source 104 which is uploaded, while other information is ignored or not uploaded.

Once established, mapping 108 may be used for subsequent updates 112 that may be received or retrieved from data sources 104. Updates 112 may include any new or modified information that is retrieved from any of the mapped data sources 104. For example, update 112 of a police record may include an indication of whether an individual is arrested again and on what charge, or an update when his ongoing criminal court case is resolved. Social updates 112 may include any new social media posts from a particular social media account or other social media posts with are tagged or linked to a particular user or user account.

In an embodiment, DCIS 102 may divide, separate, or tag the data or information retrieved from data sources 104 into different categories 114. Categories 114 may be applied to the data or information supplied by or retrieved from data sources 104 and/or the various fields or columns of a particular data record 110.

In an embodiment, DCIS 102 may apply four POLE categories to the various data fields of a data record 110. POLE refers to categorizing the data as belonging to or being associated with a Person, Object, Location, or Event. In an embodiment, the various information uploaded or retrieved from the various data sources 104 may be stored across one or more data records 110, in which each record corresponds to one of the POLE categories 114. Other embodiments may apply different numbers of POLE categories.

In an embodiment, rather than organizing the data from data sources into a traditional database, DCIS 102 may organize the data into a graph database based on the POLE categories 114. This may include mapping each field of information uploaded from any of the data sources to one of the POLE entities. In another embodiment, a particular field may be mapped to two different entities, which may be logged or tracked as identifying a relationship 116, as discussed in greater detail below.

A graph database may use graph structures for semantic queries with nodes, edges, and properties that are used to represent and store data. The graph database may use edges or relationships 116 to relate (or unrelate) the data or information of the various POLE categories (from across various data sources 104). An edge or relationship 116 may allow the data in the database or other DCIS 102 data store to be linked together directly, and accessed or modified through a single operation. Relationships 116 may then be directly queried by a user, deleted, modified, or displayed on interface 106.

DCIS 102 may provide different visual implementations of graph databases enabling users to identify connections or relationships 116 when navigating or browsing the information retrieved from the various data sources 104. Without the interface 106 of DCIS 102, it may be impossible for a user to access and view all of the information pertaining to a particular category 114 on a simultaneously, on a single device, or on a single or interface. For example, a user may not be able to access or maintain simultaneous access to all the information from the various data sources 104 simultaneously due to processing, security, and/or network bandwidth constraints.

Interface 106 may make data that would otherwise be inaccessible or unavailable on the same screen accessible, organized, and manageable. DCIS 102 may enable a user to identify relationships 116 between various categories 114 of information from different data sources 104 that would otherwise be simultaneously inaccessible and thus the relationships would be difficult, if not impossible, to identify manually.

FIG. 2 is a block diagram 200 illustrating an example categorization of data based on the POLE categories 114, according to an embodiment. Each category 114 may correspond to its own data entity 210A, 210B, 210C, and 210D. The various fields of the entities or data records 210 illustrated may include information that is retrieved from any combination of one or more data sources 104.

For example, information about a particular person entity or data object 210C may be retrieved from police, hospital, government, and school records. The police record may have the height of the person from an arrest, the hospital may include a blood type, the government may include a social security number and date of birth, and school records may include the last year of education completed. This different information from the various data sources may all be mapped 108 to a person entity 210C.

This mapping 108 may then be used to populate the data records 110 of multiple different person entities 210C. For example, if blood type from a hospital record is mapped as belonging to a person entity 210C. Then for different persons, Steve and Jen (occupying different data records 110), their respective blood types may be mapped to the corresponding data records 110 for the person entity 210C. Each entity 210 may include or correspond to any different number of data records 110 in DCIS 102.

In an embodiment, different person records may be missing some information or fields may be left blank. For example, while one person record 110 for person entity 210C may include medical information, such as blood type, a different person record 110 for person entity 210C may not include all the same information, because the information (such as blood type) may not be available or may have not yet been retrieved. In an embodiment, a user may identify which fields of data may be requested for various entities or records. For example, there may be a reason why a particular administrator or end user (e.g., social worker) requests the blood type of the first person (e.g., for a paternity test) but the blood type of a second person was not requested.

Interface 106 of FIG. 1 illustrates an example of how DCIS 102 may make identifying, defining, and classifying relationships more accessible and possible for end users. For example, DISC 102 may identify that information retrieved from two different data sources 104 includes overlapping or identical identifying information (e.g., such as name information). As illustrated in display section 118A of interface 106, two records (of a Person category 114) with the same name "John Doe" and same birthday "10/12" may be identified or retrieved from two different sources (Source A and Source B).

DCIS 102 may be configured to identify and flag overlapping fields of information between different records 110 or entities 210 as potentially including overlapping or related information. In an embodiment, DCIS 102 may determine that the relationship 116 between the two person records 110A, 110B with the same name and birthday has not yet been confirmed by a user. As such, DCIS 102 may flag the overlapping, similar, or identical information and present the data to an authorized user as illustrated via interface 106.

As illustrated in display 118A, the information from Source B may be presented on the left side of the screen, while the information retrieved from Source A may be displayed on the right side of the screen. In other embodiments, other visual arrangements may be possible, for example a vertical or top-down arrangement or display of information may be provided via interface 106. Or, for example, the information may be displayed as being overlapping or in different tabs.

From interface 106 a user may quickly and easily identify what information has been retrieved about John Doe, from which data source, and may determine a nature of the relationship 116 between the records. Interface 106 may request or receive input 120 confirming a nature of the relationship 116 between the Jon Doe data records 110. For example, DCIS 102 may request confirmation whether the John Does are the same individual or different individuals with the same name and same birthdays.

Without DCIS 102 retrieving, storing, categorizing, and identifying the overlapping information, it may not be possible for a user to link the information from Source A to the information from Source B through defining relationships 116.

In an embodiment, input 120 may indicate that the names are referring to the same individual and the data records should be merged or combined. In an embodiment, the information of relationship 116 may indicate that input was received on particular date/time, from a particular authorized user defining or confirming a nature of the relationship between the records 110. In other embodiments, other relationships 116 may be defined including, but not limited to: parent-child, sibling, friend, association, different persons, grandparent, spouse, girlfriend/boyfriend, caretaker, etc.

In the situation of John Doe being the same person as indicated by input 120, DCIS 102 may merge the various information retrieved from data sources 104 and provide a new graphical display 118B of the merged dataset based on the input 120 indicating the relationship information 116. DCIS 102 may update the graph database display 118 to reflect the confirmed relationship 116 values.

Then for example, fixture updates 112 from Source A or Source B may be used to update the combined record is illustrated in display 118B. Without DCIS 102, the relationship 116 may not be maintained and a user may not realize that an update to the information from Source B impacts the information from Source A, because the John Does are the same person.

Figure 3:
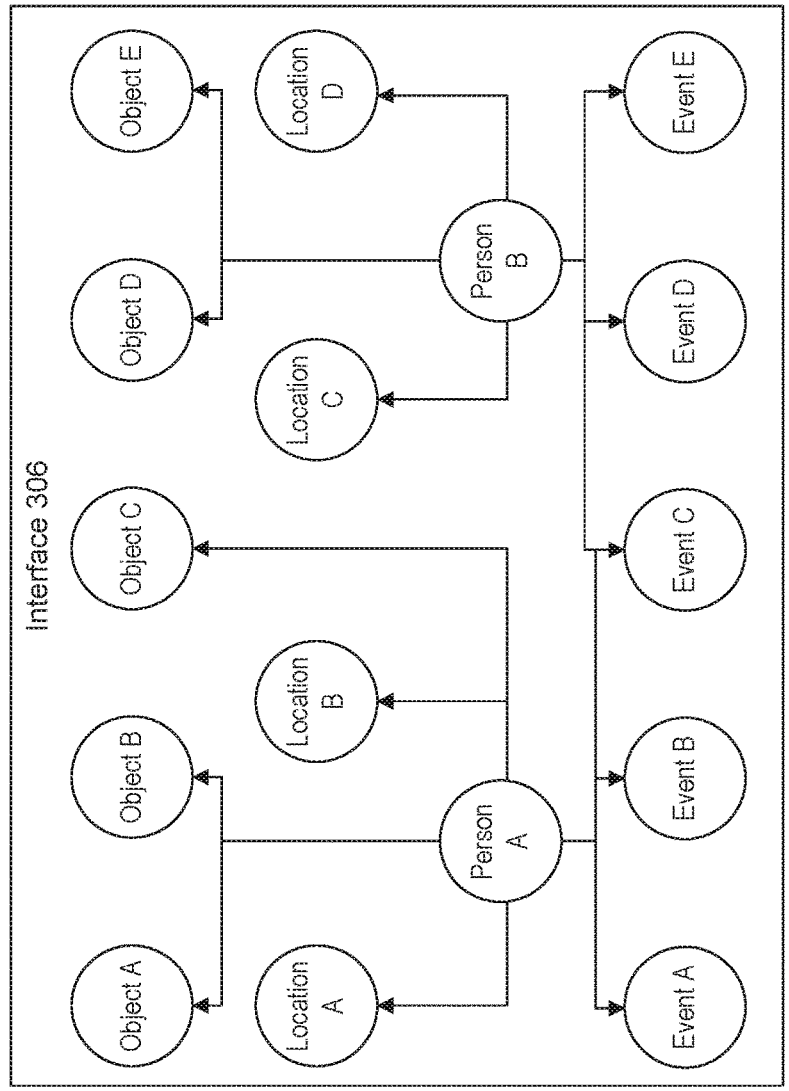
FIG. 3 is a block diagram that illustrates example operations of a data collection and integration system (DCIS), according to some embodiments.

FIG. 3 is a block diagram 300 that illustrates example operations of a data collection and integration system (DOS) 102, according to some embodiments. Interface 306 illustrates a graph enabled data set with various information that has been categorized into different POLE (person, object, location, event) entities.

The various entities of interface 306 may be Person-centric in that each remaining OLE entity may include a relationship to at least one Person entity. Objects may include attributes such as a type of risk, social media profile, phone number, e-mail address, vehicle, or other information about an object. Locations may include different locations that a person has traveled to, lives, works, shops, etc. Events may include parties, home visits, sporting matches, or other events that involved or performed by or for a particular person.

As illustrated in the example interface 306, each OLE entity relates back to at least one Person entity (e.g., Person A or Person B). Event C may be an event that relates back to both Person A and Person B, and may be used to identify, determine, or define a nature of the relationship 116 of the persons. For example, both Persons A and B may have attended the same party and their relationship 116 may be defined as being "associates" or "friends." Without interface 306, it may be impossible to make such a connection or relationship identification, because while Event C information may exist in a first data source for Person A (such as police record), event C for person B may have been in a different data source (such as hospital record).

Figure 4:
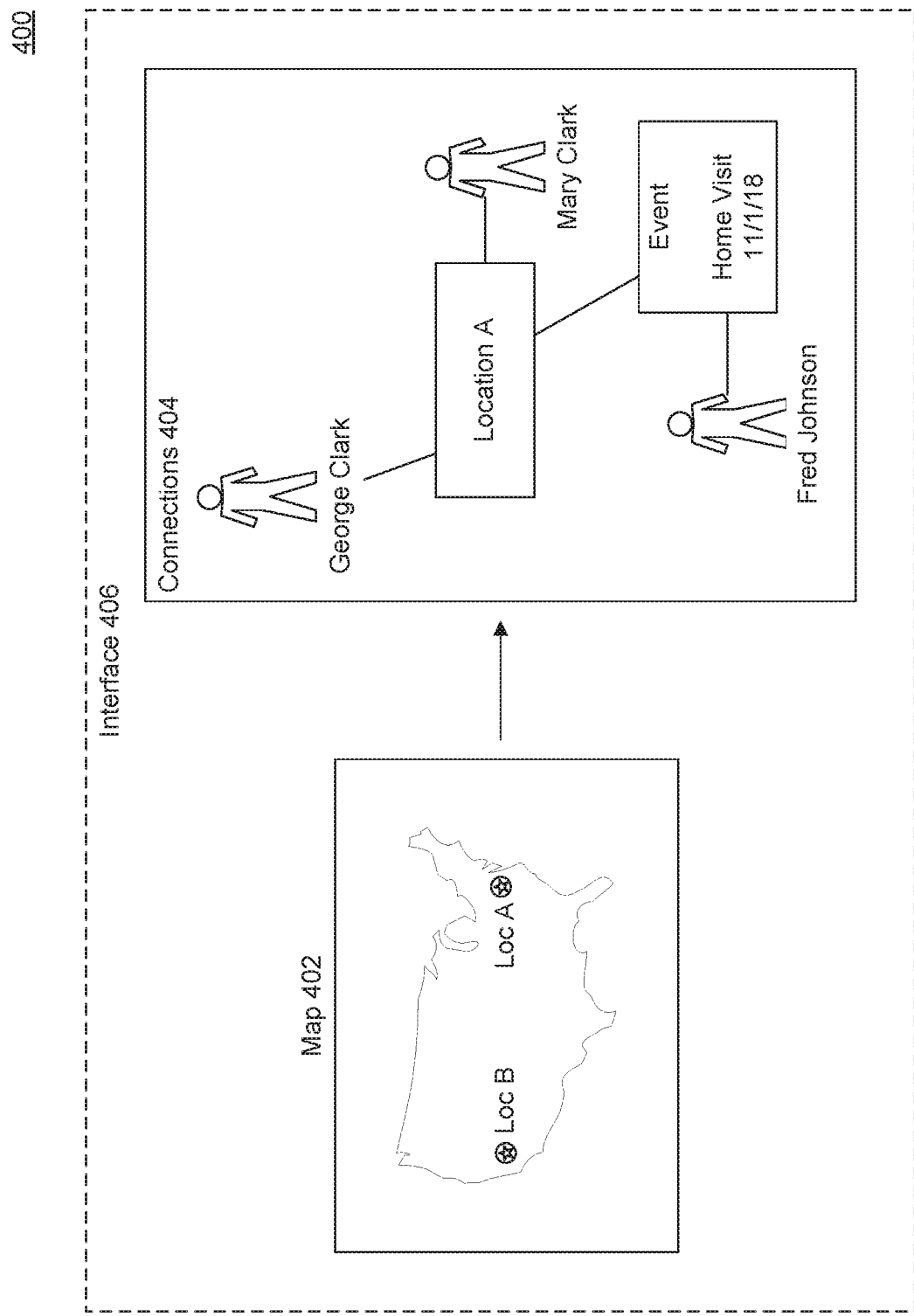
FIG. 4 is a block diagram that illustrates example operations of a data collection and integration system (DCIS), according to some embodiments.

FIG. 4 is a block diagram 400 that illustrates example operations of a data collection and integration system (DCIS) 102, according to some embodiments. Interface 406 illustrates a map 402 with markers that indicate the various locations of interest (Loc A and Loc B) that may be retrieved or identified from various records 110 corresponding to Location entities 210B. In the example shown, location A and location B may each include various information about persons or events or objects that are of interest to an end user.

In an embodiment, from interface 406, a user may select location A, and DCIS 102 may load a connections 404 for Location A. Connections 404 may graphically illustrate relationships 116 between various data records 110 as they correspond to the various POLE entities and Location A. Location A may refer to a city, state, zip code, particular address, a particular coordinate and radius, etc. In the example shown, connections 404 may graphically illustrate what information is available about Location A, and the connections or relationships between the various entities or categories of information.

For example, George Clark and Mary Clark may have both lived at Location A which may be a house address. An event on 11/1/18 may link Fred Johnson to Location A as having visited Location A.

Figure 5:
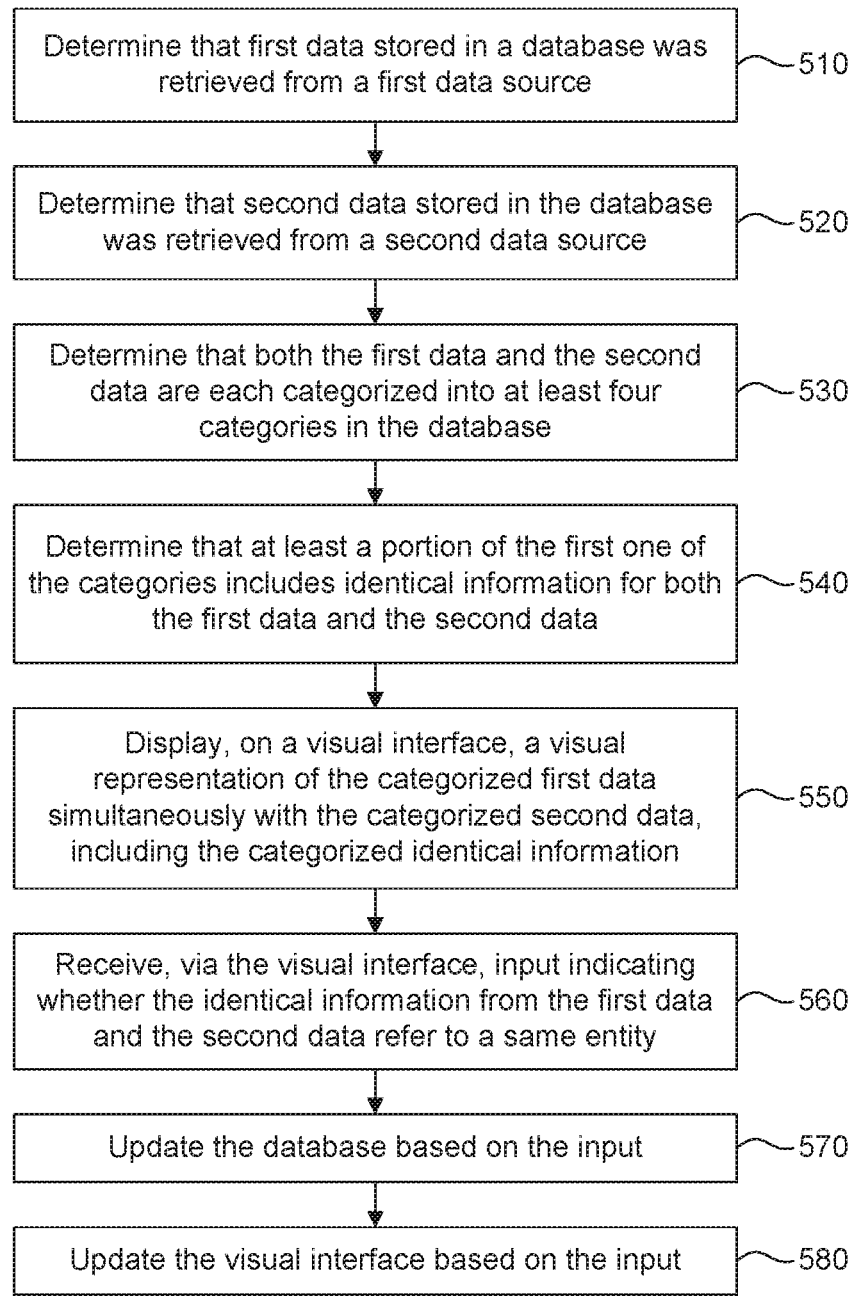
FIG. 5 is a flowchart illustrating example operations of a system for providing data collection and integration functionality, according to some embodiments.

FIG. 5 is a flowchart 500 illustrating example operations of a system for providing data collection and integration functionality, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art. Method 500 shall be described with reference to FIG. 1. However, method 500 is not limited to the example embodiments.

In 510, it is determined that first data stored in a database was retrieved from a first data source. For example, in display region 118A, data about John Doe may have been retrieved from data source B, which may correspond to any of the data sources 104.

In 520, it is determined that second data stored in the database was retrieved from a second data source. For example, in display region 118A, data about John Doe may have been retrieved from data source A, which may correspond to any of the data sources 104.

In 530, it is determined that both the first data and the second data are each categorized into at least four categories in the database. For example, as illustrated in FIG. 2 and FIG. 3, information retrieved from databases may be separated or mapped 108 into various POLE entities.

In 540, it is determined that at least a portion of the first one of the categories includes identical information for both the first data and the second data. For example, as illustrated in display region 118A, John Doe and the birthday may be overlapping in the data records retrieved from sources A and B.

In 550, a visual representation of the categorized first data is displayed on a visual interface simultaneously with the categorized second data, including the categorized identical information. For example, as illustrated in display region 118A, John Doe and the birthday may be overlapping in the data records retrieved from sources A and B. Additionally interface 106 may display relationships between other information retrieved from the data sources. For example, John Doe from source B may have Born on 'entity A' which may correspond to a field from one of the data sources 104, and from source A, John Do may be the Owner of 'Entity C' which may correspond to a data record of a Location Entity.

In 560, input indicating whether the identical information from the first data and the second data refer to a same entity is received from via the visual interface. For example, DCIS 102 may receive input 120 through interface 106 indicating that John Doe is the same person record and that the records should be combined.

In 570, the database is updated based on the input. For example, DCIS 102 may update the relationship 116 record to indicate that the fields from Source A and B are related.

In 580, the visual interface is updated based on the input. For example, as illustrated in display 118B, the merged fields or record may be displayed.

Figure 6:
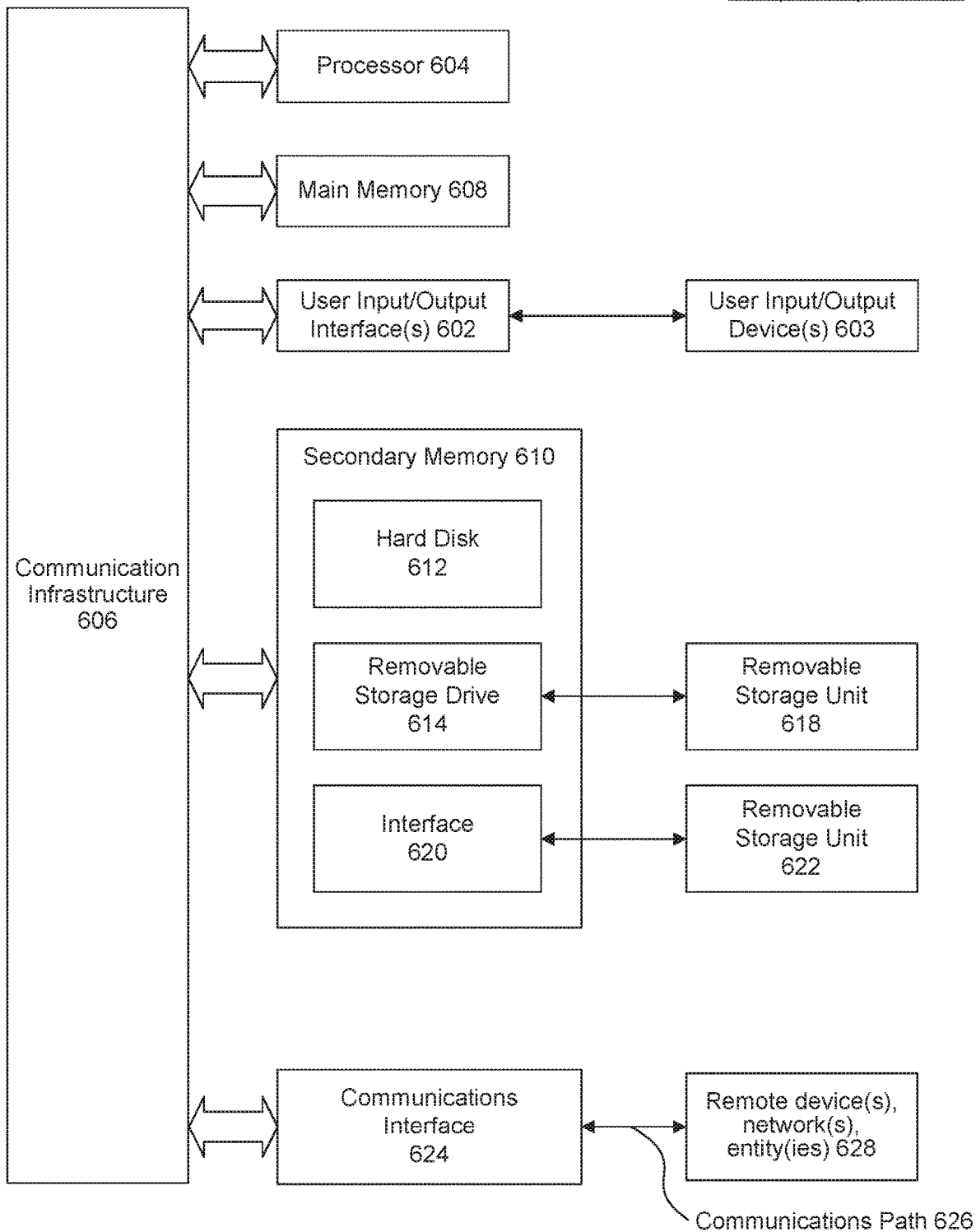
FIG. 6 is example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include customer input/output device(s) 603, such as monitors, keyboards, pointing devices, etc., which may communicate with communication infrastructure 606 through customer input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method comprising:
    identifying, by at least one processor, what information is to be retrieved from each of a plurality of data sources based on a mapping, wherein the mapping includes login information for a user across each of a plurality of data sources, including a first data source and a second data source;
    determining, by the at least one processor, that first data stored in a database was retrieved from the first data source based on the mapping;
    determining, by the at least one processor, that second data stored in the database was retrieved from the second data source based on the mapping;
    determining, by the at least one processor, that both the first data and the second data are each categorized into a first category of four different categories in the database based on the mapping, wherein each category comprises a plurality of fields;
    determining, by the at least one processor, that at least a portion of the first data is identical to at least a portion of the second data for the first category, wherein the portion of the first data is stored in a first record in the database and the portion of the second data is stored in a second record in the database, wherein the first record is different from the second record;
    flagging, by the at least one processor, the identical information in both the first record and the second record;
    providing for display on a visual interface, responsive to the flagging, a visual representation of the flagged first record simultaneously with the flagged second record, including the identical portion;
    requesting user confirmation whether the first record and the second record are a same entity;
    receiving, via the visual interface, the user confirmation indicating that the first record and the second record refer to the same entity;
    combining the first record and the second record in the database responsive to the user confirmation; and
    updating the visual interface based on the confirmation.

2. The method of claim 1, wherein the at least four include a person category, object category, location category, and event category.

3. The method of claim 2, wherein the displaying comprises:
    displaying a map based on the location category, wherein the map indicates at least one other category of information and an alert associated with the at least one or category of information.

4. The method of claim 2, wherein the indicial information comprises name information categorized in the person category.

5. The method of claim 4, wherein the receiving comprises:
    receiving input indicate that the identical information refers to the same entity.

6. The method of claim 5, wherein the updating the database comprises:
    merging the first data with the second data in the database, wherein the merging comprises combining the categorized first data and the categorized second data and removing the identical information from at least one of the first data or the second data.

7. The method of claim 6, wherein the updating the visual interface comprises:
    displaying, on a visual interface, a visual representation of the categorized merged data wherein the identical information only appears once, and wherein the visual interface indicates which data was retrieved from the first data source and which data was retrieved from the second data source.

8. The method of claim 6, further comprising:
    receiving an update from at least one of the first data source or the second data source; and
    updating the merged data in the database with the update.

9. The method of claim 1, wherein the database comprises a graph database.

10. The method of claim 1, wherein the mapping includes at least two different passwords for the user.

11. A system comprising:
    a memory; and
    at least one processor coupled to the memory and configured to perform operations comprising:
        identifying, by the at least one processor, what information is to be retrieved from each of a plurality of data sources based on a mapping, wherein the mapping includes login information for a user across each of a plurality of data sources, including a first data source and a second data source;
        determining, by the at least one processor, that first data stored in a database was retrieved from the first data source based on the mapping;
        determining, by the at least one processor, that second data stored in the database was retrieved from the second data source based on the mapping;
        determining, by the at least one processor, that both the first data and the second data are each categorized into a first category of four different categories in the database based on the mapping, wherein each category comprises a plurality of fields;
        determining, by the at least one processor, that at least a portion of the first data is identical to at least a portion of the second data for the first category, wherein the portion of the first data is stored in a first record in the database and the portion of the second data is stored in a second record in the database, wherein the first record is different from the second record;

flagging, by the at least one processor, the identical information in both the first record and the second record;

providing for display on a visual interface, responsive to the flagging, a visual representation of the flagged first record simultaneously with the flagged second record, including the identical portion;

requesting user confirmation whether the first record and the second record are a same entity;

receiving, via the visual interface, the user confirmation indicating that the first record and the second record refer to the same entity;

combining the first record and the second record in the database responsive to the user confirmation; and updating the visual interface based on the confirmation.

12. The system of claim 11, wherein the at least four include a person category, object category, location category, and event category.

13. The system of claim 12, wherein the displaying comprises:

displaying a map based on the location category, wherein the map indicates at least one other category of information and an alert associated with the at least one or category of information.

14. The system of claim 12, wherein the indicial information comprises name information categorized in the person category.

15. The system of claim 14, wherein the receiving comprises:

receiving input indicate that the identical information refers to the same entity.

16. The system of claim 15 wherein the updating the database comprises:

merging the first data with the second data in the database, wherein the merging comprises combining the categorized first data and the categorized second data and removing the identical information from at least one of the first data or the second data.

17. The system of claim 16, wherein the updating the visual interface comprises:

displaying, on a visual interface, a visual representation of the categorized merged data wherein the identical information only appears once, and wherein the visual interface indicates which data was retrieved from the first data source and which data was retrieved from the second data source.

18. The system of claim 16, further comprising:

receiving an update from at least one of the first data source or the second data source; and updating the merged data in the database with the update.

19. The system of claim 11, wherein the database comprises a graph database.

20. A non-transitory computer-readable device having instructions stored thereon that, when executed by at least one processor, cause the at least one processor to perform operations comprising:

identifying, by at least one processor, what information is to be retrieved from each of a plurality of data sources based on a mapping, wherein the mapping includes login information for a user across each of a plurality of data sources, including a first data source and a second data source;

determining, by the at least one processor, that first data stored in a database was retrieved from the first data source based on the mapping;

determining, by the at least one processor, that second data stored in the database was retrieved from the second data source based on the mapping;

determining, by the at least one processor, that both the first data and the second data are each categorized into a first category of four different categories in the database based on the mapping, wherein each category comprises a plurality of fields;

determining, by the at least one processor, that at least a portion of the first data is identical to at least a portion of the second data for the first category, wherein the portion of the first data is stored in a first record in the database and the portion of the second data is stored in a second record in the database, wherein the first record is different from the second record;

flagging, by the at least one processor, the identical information in both the first record and the second record;

providing for display on a visual interface, responsive to the flagging, a visual representation of the flagged first record simultaneously with the flagged second record, including the identical portion;

requesting user confirmation whether the first record and the second record are a same entity;

receiving, via the visual interface, the user confirmation indicating that the first record and the second record refer to the same entity;

combining the first record and the second record in the database responsive to the user confirmation; and updating the visual interface based on the confirmation.

* * * * *